United States Patent [19]
Moore et al.

[11] 4,130,458
[45] Dec. 19, 1978

[54] PRODUCT CONTAINING ALUMINA TRIHYDRATE AND A SOURCE OF $B_2O_3$ AND METHOD

[75] Inventors: Gregory R. Moore, West Chicago; Craig A. Fischer, Sycamore, both of Ill.

[73] Assignee: Masonite Corporation, Chicago, Ill.

[21] Appl. No.: 796,509

[22] Filed: May 13, 1977

Related U.S. Application Data

[63] Continuation of Ser. No. 588,687, Jun. 20, 1975, abandoned.

[51] Int. Cl.² .............................................. D21H 3/66
[52] U.S. Cl. .............................. 162/159; 106/15 FP; 162/181 A; 162/181 B; 252/8.1; 428/921
[58] Field of Search .................... 106/15 FP; 252/8.1; 162/159, 181 A, 181 B; 428/921

[56] References Cited

U.S. PATENT DOCUMENTS

| 1,907,711 | 5/1933 | Becher | 162/159 |
| 2,108,761 | 2/1938 | Becher | 161/159 |
| 2,611,694 | 9/1952 | Becher | 162/159 |
| 3,245,870 | 4/1966 | Orth et al. | 162/159 |
| 3,629,055 | 12/1971 | Riem et al. | 162/159 |

Primary Examiner—Lorenzo B. Hayes
Attorney, Agent, or Firm—Richard H. Anderson

[57] ABSTRACT

The ASTM E84 flamespread of fibrous products such as hardboard is reduced by incorporation of a combination of alumina trihydrate and a source of $B_2O_3$, such as boric acid. The $B_2O_3$ source should be capable of providing $B_2O_3$ at a temperature below 400° C.

25 Claims, No Drawings

PRODUCT CONTAINING ALUMINA TRIHYDRATE AND A SOURCE OF $B_2O_3$ AND METHOD

CROSS REFERENCE TO RELATED APPLICATION

This application is a continuation of co-pending application Ser. No. 588,687, filed June 20, 1975, now abandoned.

FIELD OF THE INVENTION

This invention relates to a fire retardant, reconstituted wood-based product containing alumina trihydrate and a source of $B_2O_3$ capable of providing $B_2O_3$ at a temperature lower than about 400° C. The $B_2O_3$ can be provided by a number of compounds such as boric acid, ammonium pentaborate, ammonium biborate, or other ammonium borate compounds. The combination of alumina trihydrate and a source of $B_2O_3$ synergistically prevents the spread of flame along man-made, wood-based product.

BACKGROUND OF THE INVENTION

Finding safe, reliable and inexpensive means for making noncombustible products is one of the most important problems facing many industries today. Regulations relating to the flammability of building products, textiles, appliances and the like are becoming much more stringent, and will continue to be more stringent as the public is made more aware of the hazards presented by combustible materials. The hardboard industry is no exception to this trend, and the use of hardboard paneling is currently being restricted because of its inherent flammability.

The standard test for the flammability of building products is the ASTM E84 (Steiner tunnel) test. By this test, materials are rated for: (1) flamespread index (FSI) (2) fuel contribution, and (3) smoke generation. All materials are rated relative to asbestos cement board (0 on all indices) and red oak (100 on all indices). Hardboard typically receives a flamespread index of 175–200 (Class III), a fuel contributed value of 150, and a smoke index of 400–600. In contrast, a low-hazard material such as gypsum board typically receives a flamespread of 10–15 (Class I), a fuel contributed value of 15–30 and a smoke index of 0. While all three indices are important, flamespread and smoke are the major concern. Class I products have indices of 0–25, Class II products range from 26–75 and Class III materials have indices between 76 and 200.

In testing various materials in the laboratory, a 2 feet standardized lab tunnel, commonly known as a Monsanto tunnel (J. Paint Technology, Vol. 39, No. 511, page 494, 1967, and Vol. 46, No. 591, pages 62–69, 1974) is used. This tunnel consists basically of a $24 \times 4$ inch angle iron frame inclined at 28° from the horizontal into which the board sample ($23\frac{1}{2} \times 3\frac{3}{4} \times 0.2$–$0.3$ inch) is placed. A gas burner (Fisher Scientific No. 3-902) is mounted so that the burner flame impinges the lower end of the board. The maximum distance that the burning flame tip moves up the inclined board under controlled gas flow in four minutes is reported. A reliable correlation has been found between the Monsanto 2 feet tunnel and the 25 feet Steiner tunnel. If the longest flame length in the Monsanto tunnel during the 4 minute test is 12–13 inch the panel would attain a Class I rating in the E84 test. Flamelengths up to 17–18 inch correspond to Class II materials. No smoke or fuel measurements have been made on the Monsanto tunnel. The Steiner tunnel uses both time and distance to determine flamespread indices and due to the method of calculation many treatments will reduce the flamespread index of hardboard to the 90–110 range. It is much more difficult, however, to reduce the flamespread index from 100 to 75 since the flammability must almost be reduced by an additional one-half to move these last 25 points into the Class II range. The synergistic mixture of alumina trihydrate and borate readily reduces the flamespread index of hardboard to the Class I or Class II level.

Several approaches have been taken to reduce the flame-spread of hardboard in previous years when flammability was not quite as crucial a concern. Physical characteristics such as caliper, specific gravity, and embossing were examined for their effects on flamespread and it was found that denser, thicker panels received the lowest flamespreads, while embossing had little effect. Asbestos and metal overlays were tried as a means of reducing flamespread, but with little success. It became evident that flamespread reduction was more than just a surface phenomenon, involving instead the characteristics of the entire board. With this in mind, a variety of commonly accepted chemical treatments were attempted, but none could sufficiently reduce the flamespread to an acceptable level without adversely affecting moisture sensitivity and other board properties. Severe production problems were also common to these treatments.

More recently attention has been diverted from chemical treatments to the concept of fuel dilution. As the term suggests this involves substituting noncombustible (generally inorganic) materials for wood fiber until the desired flamespread reduction is achieved. Little work had been done previously with this concept since it is normally considered an inefficient mechanism, requiring too much expensive substitute material. Dilution levels of 65–80% are not unusual to attain select levels of fire retardance. In arriving at the present invention, an extensive evaluation of various diluents was undertaken in the fabrication of hardboard. Materials such as fly ash, cement, vermiculite ore, slag, and mineral wool were examined. Mineral wool was selected as the most likely candidate for investigation since it was fibrous in nature and low in cost and an extensive evaluation of fuel dilution in hardboard followed. As suspected, very high dilution levels on the order of 75% (75 parts mineral wool — 25 parts wood fiber) were required to achieve a Class II flamespread rating. At such low wood fiber levels the physical properties of the board were very poor, so an extensive amount of work was done to bring these properties up to an acceptable level. Eventually, acceptable interior and exterior Class II hardboard formulations were developed in the laboratory but attempts to produce such formulations in the plant met with little success because the mineral wool proved too fragile for existing equipment and quickly broke down into fines. Low levels were added successfully, but at high levels the wetlap became muddy and unhandleable. Dry process formulations were developed in the laboratory but were not run at the manufacturing plants.

Work with the mineral wool indicated that if substitution levels could be reduced to 50% or less the chances for success with fuel dilution on existing plant equipment would be much better. Studies showed that there was little difference between inert fuel diluents except as flamespread was affected by inadequate retention and distribution. What was needed therefore was a low-cost fuel diluent that would provide an active contribution to flamespread reduction of the remaining combustible fibers in addition to its passive roll as a diluent.

One such diluent meeting these requirements was alumina trihydrate, $Al_2O_3.3H_2O$. This white powdery material is approximately 35% by weight water and exhibits a considerable endotherm in the same temperature range at which hardboard begins to undergo severe pyrolysis. Little or no water of hydration is lost during hot pressing. Thus, this material could be used as an active fuel diluent and on the basis of its thermal data should be more effective than mineral wool. This was subsequently shown to be true as 40–45% alumina trihydrate was as effective as 65–75% mineral wool. This research work was then moved to the plant trial stage.

During the initial alumina trihydrate plant trials boards with 40–45% diluent were targeted but these levels were not reached because of wetlap handling problems. No Class II hardboard was made since 32–34% alumina trihydrate was the maximum level attained. Products with this level attained low Class III flamespread ratings in the 25 feet tunnel. As the program progressed into its later stages and operating personnel became more familiar with running this diluent, the 40–45% levels were reached; but it was believed necessary in the initial stages to limit the alumina level to 32%, so a means of further increasing its effectiveness was sought. This led to examination of mixtures of chemicals and fuel diluents in an effort to combine the expertise in each of these areas into one cause.

DESCRIPTION OF PRIOR ART

It is well known to employ boron compounds such as boric acid, $B_2O_3$, and ammonium borates for the purpose of flame-proofing products containing one or more flammable fibrous components. It is further well known to use alumina trihydrate ($Al_2O_3.3H_2O$ or $Al(OH)_3$) as a flame-proofing component in the production of fibrous products. However, before the present invention, no one has used the combination of a $B_2O_3$ source, selected from the group consisting of boric acid, $B_2O_3$, and an ammonium borate, together with alumina trihydrate for fire proofing a combustible fibrous product.

The following patents disclose the use of boron compounds for fire-proofing a product containing a flammable fibrous component: Trent — U.S. Pat. No. 87,005; Eichengrun — U.S. Pat. No. 1,612,104; Vivas — U.S. Pat. No. 1,612,676; Edwards — U.S. Pat. No. 1,778,147; Vivas — U.S. Pat. No. 1,839,136; Desper — U.S. Pat. No. 1,879,128; Wiener et al — U.S. Pat. No. 1,937,679; Quinn — U.S. Pat. No. 2,030,653; Becher — U.S. Pat. No. 2,108,761; Hopkinson — U.S. Pat. No. 2,250,483; Cook et al — U.S. Pat. No. 2,381,487; Jones et al — U.S. Pat. No. 2,452,055; Jones — U.S. Pat. No. 2,523,626; Niesen — U.S. Pat. No. 2,526,083; Farber — U.S. Pat. No. 2,573,253; Lauring — U.S. Pat. No. 2,594,937; Van De Zande — U.S. Pat. No. 2,769,729; Lauring — U.S. Pat. No. 2,849,316; Dunn et al — U.S. Pat. No. 2,875,044; Hunter et al — U.S. Pat. No. 3,028,411; Hunter et al — U.S. Pat. No. 3,131,071; Videen — U.S. Pat. No. 3,202,570; Behr et al — U.S. Pat. No. 3,220,858; Orth et al — U.S. Pat. No. 3,245,870; Pataski et al — U.S. Pat. No. 3,321,421; Cooper et al — U.S. Pat. No. 3,367,863; Draganov — U.S. Pat. No. 3,378,381; Chase — U.S. Pat. No. 3,438,847; Humphrey — U.S. Pat. No. 3,524,761; Dunay et al — U.S. Pat. No. 3,553,132; Ashton — U.S. Pat. No. 3,560,253; Winters et al — U.S. Pat. No. 3,560,351; Bell — U.S. Pat. No. 3,619,352; Riem et al — U.S. Pat. No. 3,629,005; Woods — U.S. Pat. No. 3,816,307; Cavazos et al — U.S. Pat. No. 3,819,517; Arthur Jr et al — U.S. Pat. No. 3,821,196.

The following patents disclose the use of alumina hydrate or alumina trihydrate for making a fire-retardant, flammable fibrous product: Becher — U.S. Pat. No. 2,108,761; Becher — U.S. Pat. No. 2,611,694; Sanderford et al — U.S. Pat. No. 3,699,041; Burton — U.S. Pat. No. 3,741,929; and Nicodemus et al — U.S. Pat. No. 3,772,455. Of the above patents, the Cook et al — U.S. Pat. No. 2,381,487; Orth et al — U.S. Pat. No. 3,245,870 and Cooper et al — U.S. Pat. No. 3,367,863 patents teach the use of boron compounds with alumina trihydrate.

SUMMARY OF THE INVENTION

An object of the present invention is to provide a man-made cellulosic product having reduced flamespread characteristics.

Another object of the present invention is to provide a man-made, wood-based product with a synergistic combination of alumina trihydrate and a $B_2O_3$ source selected from the group consisting of boric acid, $B_2O_3$, and an ammonium borate.

Another object of the present invention is to provide a man-made, wood-based product having new and reduced flamespread characteristics resulting from the combination of alumina trihydrate in an amount of about 10–60% by weight of the product, and a boron compound yielding $B_2O_3$ at a temperature below about 400° C.

Another object of the present invention is to provide a new and improved man-made, wood-based, product having vastly improved moisture resistance as compared to the use of common fire retardants well known in the trade.

Another object of the present invention is to provide an inexpensive man-made, wood-based product by materially reducing the amount of alumina trihydrate necessary for fabricating an ASTM E84 — Class II flamespread rated product (having a flamespread index (FSI) between 26 and 75) by including a minor amount of a boron compound capable of yielding $B_2O_3$ at a temperature less than about 400° C.

Another object of the present invention is to provide a Class I FSI rated man-made, wood-based product (FSI less than 25) while incorporating less than 45% by weight alumina trihydrate.

In brief, the above and other objects and advantages of the present invention are achieved by incorporating both alumina trihydrate and a source of $B_2O_3$ in a man-made, combustible, wood-based product such as hardboard. Quite surprisingly, it was found that the combination of a source of $B_2O_3$ and alumina trihydrate synergistically lowers the flamespread index on man-made, wood-based products. The results of flamespread tests on such man-made cellulosic boards containing alumina trihydrate and a boron compound that yields $B_2O_3$ at a temperature below 400° C. are fed better than the additive results achieved by each component alone. This is especially surprising when the non-linear nature of the standard ASTM E84 test is taken into consideration. The resulting board also has excellent moisture-resistance properties and in many ASTM E84 tests no measurable smoke is detected during the test.

When the new and improved man-made fibrous product of the present invention is made by the wet process, the alumina trihydrate is added to a slurry of water and wood fiber. The $B_2O_3$ source is added to the surface of the wetlap during primary manufacture of the product or is impregnated into the completed product in a secondary operation. Common technology well known to those in the trade is used. In this manner, the $B_2O_3$ source is drawn into the wetlap from the surface and is evenly distributed throughout the board during drying and consolidation. Generally, consolidation is achieved by hot-press conditions well known in the art for the particular type of product made.

When this new product is made by the dry process, the alumina trihydrate and $B_2O_3$ source can be premixed in powder form and added at any convenient point to the wood fiber. The alumina trihydrate and $B_2O_3$ source may also be added separately in powder form during the primary manufacture of the product or else the alumina trihydrate may be added to the wood fiber and the $B_2O_3$ source added via a post-press solution impregnation. Here again the art of vacuum-pressure impregnation is well known to those in the trade. More of the synergistic mixture of alumina trihydrate and $B_2O_3$ source may be added to the center of the product than the faces but the exact distribution is not critical with respect to the uniqueness of the synergism noted. Similar synergistic responses have been noted in medium-density fiberboards and particle or flakeboard common to the trade. In any process the method or order of addition of this synergistic mixture is not critical.

DESCRIPTION OF THE PREFERRED EMBODIMENTS

The new and improved wood-based, man-made fibrous product of the present invention generally comprises a flammable fibrous component, such as cellulosic fibers, alumina trihydrate in an amount of about 10–60% by weight of the finished product, and a $B_2O_3$ source in an amount of about ½–7% by weight of the finished product. The flammable fibrous component generally comprises about 20–90% by weight of the finished product. To achieve the full advantage of the present invention, the $B_2O_3$ source should be capable of providing $B_2O_3$ at a temperature less than about 400° C. and particularly at or below the pyrolysis temperature of the product.

When the source of $B_2O_3$ is boric acid, it is preferred to include a basic buffer, such as borax, in an amount approximately equal to the amount of the $B_2O_3$ source. The buffer will prevent undue hydrolysis of the board in localized areas of boric acid accumulation and aids in solubilizing the boric acid. During hot-pressing, the localized accumulations of boric acid could otherwise result in charring of the board. The buffer is not essential, especially when the $B_2O_3$ source is evenly distributed throughout the product. The buffer need not be present to achieve the synergistic flamespread reductions provided by the combination of alumina trihydrate and a $B_2O_3$ source.

In the research program leading to the present invention, many fuel diluents such as mineral wool, fly ash, vermiculite, clays, Portland cement, perlite, diatomaceous earth, and the like were examined but alumina trihydrate was superior with its inherent water of hydration and endothermic properties compatible with wood. Many alumina trihydrate/wood fiber Class II (FSI 75 or less) boards were made without problem in the laboratory but early attempts to run similar formulations on production lines were thwarted due to unanticipated problems. After considerable experience, operating personnel were able to run such formulations successfully but these early failures provided a strong impetus to minimize the weight percent needed of alumina trihydrate. Combining the alumina with other well known fire-retardant chemicals was the first facet of that research program and led to the surprising discovery of the alumina trihydrate — $B_2O_3$ synergism in cellulosic based materials. All experimentation has shown that the lower the alumina additive level the fewer the production problems and the more satisfactory the resulting properties.

In attempting to supplement the flame resistance characteristics of alumina trihydrate with other well known flame retardent compounds, it was found that many of the well known compounds are actually detrimental to the flame-resistance characteristics of the board containing alumina trihydrate. As set forth in Table I some of the detrimental flame retardant compounds are diammonium phosphate and monoammonium phosphate. Others such as zinc chloride and zinc borate give no improvement or, at best, the results are merely additive. Boric acid and the ammonium borates, however, produced remarkable and synergistic flame-spread reduction when combined with alumina trihydrate. The useful boric acids are at least partially hydrated since even anhydrous boric acid is quickly partially hydrated by picking up moisture from the air. The partially dehydrated anhydrous boric acid was rehydrated by allowing a board containing anhydrous boric acid to reach its equilibrium moisture content of about 7% by standing for about 8 hours. The partially dehydrated boric acid was partially dehydrated by heating a board containing boric acid in an oven at 105° C. for a period of about 8 hours. The boards tested in obtaining the results of Table I were made by the dry process to achieve more uniform alumina trihydrate distribution but the same results are noted on wet process board.

Table I

Flamelength Reductions in Blends of Alumina Trihydrate and Fiber Due to the Addition of Various Fire Retardant Chemicals

| Composition* % by weight of total | Monsanto Tunnel Flamelength | Flamelength of Control | Flamelength Net Change |
|---|---|---|---|
| Monoammonium phosphate (5%) Alumina trihydrate (45%) Fiber (50%) | 17" | 15" | +2" |
| Diammonium phosphate (5%) Alumina trihydrate (45%) Fiber (50%) | 16¼" | 14¼" | +2" |
| Zinc chloride (5%) Alumina trihydrate (45%) Fiber (50%) | 15" | 14¼" | +¾" |
| Zinc borate (5%) Alumina trihydrate (47.5%) Fiber (47.5%) | 14" | 14¼" | −¼" |
| Sodium borate (5%) Alumina trihydrate (45%) Fiber (50%) | 13¼" | 14¼" | −1" |
| Partially rehydrated anhydrous boric acid (5%) Alumina | 14" | 16¼" | −2¼" |

Table I-continued

Flamelength Reductions in Blends of Alumina Trihydrate and Fiber Due to the Addition of Various Fire Retardant Chemicals

| Composition* % by weight of total | Monsanto Tunnel Flamelength | Flamelength of Control | Flamelength Net Change |
|---|---|---|---|
| trihydrate (45%) Fiber (50%) Partially dehydrated boric acid (5%) | 13½" | 17" | −3½" |
| Alumina trihydrate (45%) Fiber (50%) Boric acid (5%) | 10½" | 14½" | −4" |
| Alumina trihydrate (45%) Fiber (50%) Ammonium pentaborate (5%) | 10" | 15" | −5" |
| Alumina trihydrate (45%) Fiber (50%) | | | |

*The fiber was the dry pressure refined type described in Table X

Since these results were quite surprising, boric acid was investigated further. Table II shows the effect of the addition of 2.5% boric acid based on the total weight of alumina trihydrate plus fiber and various ratios of alumina trihydrate to dry-process fiber board made from the pressure refined fiber described in Table X. As can be readily seen, this small boric acid add substantially reduced the amount of alumina trihydrate required for a Class I or II product.

Table II

Monsanto Tunnel Tests of Dry Process Hardboard Containing Various Levels of Alumina Trihydrate and Boric Acid

| Composition* (% by weight) | Monsanto Tunnel Flamespread Length** | |
|---|---|---|
| | Without Boric Acid Add | 2.5% Boric Acid Added |
| Alumina trihydrate (60%) Fiber (40%) | 12¼" | — |
| Alumina trihydrate (55%) Fiber (45%) | 14¼" | — |
| Alumina trihydrate (50%) Fiber (50%) | 15" | 11" |
| Alumina trihydrate (40%) Fiber (60%) | 17¼" | 13" |
| Alumina trihydrate (30%) Fiber (70%) | 19¼" | 16" |
| Alumina trihydrate (20%) Fiber (80%) | 23" | 18¼" |

*The fiber was the dry process pressure refined type described in Table X.
**The boric acid was a granular form added to the blend of alumina trihydrate and fiber.

Table III shows the effects of various add levels of boric acid to 50/50 and 30/70 (alumina trihydrate, dry-process, hardboard fiber) blends.

Table III

Monsanto Tunnel Tests of Dry Process Hardboard Containing Various Levels of Boric Acid at Constant Alumina Trihydrate Level

| Composition* (% by weight) | | Monsanto Tunnel Flamespread Length |
|---|---|---|
| Alumina trihydrate (50%) Fiber (50%) | | 14" |
| Alumina trihydrate (50%) Fiber (50%) | plus ½%** boric acid | 13½" |
| Alumina trihydrate (50%) Fiber (50%) | plus 1% boric acid | 13" |
| Alumina trihydrate (50%) Fiber (50%) | plus 1½% boric acid | 11¼" |
| Alumina trihydrate (50%) Fiber (50%) | plus 2% boric acid | 11¼" |
| Alumina trihydrate (50%) Fiber (50%) | plus 2½% boric acid | 11¼" |
| Alumina trihydrate (50%) Fiber (50%) | plus 5% boric acid | 10¼" |
| Alumina trihydrate (30%) Fiber (70%) | | the flame traveled the length of the tunnel (24") in 3 minutes 30 seconds |
| Alumina trihydrate (30%) Fiber (70%) | plus 1½% boric acid | 21" |
| Alumina trihydrate (30%) Fiber (70%) | plus 2½% boric acid | 20¼" |
| Alumina trihydrate (30%) Fiber (70%) | plus 5% boric acid | 18" |
| Alumina trihydrate (30%) Fiber (70%) | plus 10% boric acid | 16" |

*The fiber was the dry process pressure refined type described in Table X. The boric acid was a granular form added to the alumina trihydrate and fiber slurry.
**Additions of boric acid based on % by total weight of alumina trihydrate and fiber.

A mixture of ammonium pentaborate/boric acid may also be suitable for addition to the alumina trihydrate/wood fiber mixture.

Tests made on boards containing various percentages of alumina trihydrate and ammonium pentaborate gave the flame-spread reduction data set forth in Table IV.

Table IV

Monsanto Tunnel Tests of Wet Process Hardboard Containing Various Levels of Alumina Trihydrate and Ammonium Pentaborate

| Composition* (% by weight) | Monsanto tunnel Flamespread Length | |
|---|---|---|
| | without borate add | with borate add** |
| Alumina trihydrate (25%) Fiber (75%) | 23½" | 18¼" |
| Alumina trihydrate (33%) Fiber (67%) | 21¼" | 16" |
| Alumina trihydrate (50%) Fiber (50%) | 14¼" | 11" |

*The fiber was the wet process interior type described in Table X.
**The ammonium pentaborate add level was 3-4%. A vacuum-pressure impregnation was used.

The surprising nature, and the synergistic character of the combination of alumina trihydrate and a source of $B_2O_3$ is shown in Table V wherein a board containing alumina trihydrate plus diammonium phosphate is compared to a board containing alumina trihydrate and boric acid. As set forth in the Table V, diammonium phosphate is at least as effective as boric acid alone in reducing the flamespread index of a fiberboard. However, when added to a board containing alumina trihydrate, the combination of alumina trihydrate with boric acid reduced the flamespread length from 14½ inches to about 10½ inches whereas the combination of alumina trihydrate with diammonium phosphate increased the FSI from 14½ inches to 16¼ inches. The results with other compounds capable of providing $B_2O_3$ at a temperature below about 400° F. were also synergistic and surprising.

Table V

A Comparison of the Effectiveness of Diammonium Phosphate and Boric Acid in Dry Process Hardboard

| Composition* (% by weight) | Monsanto Tunnel Flamespread Length | | |
|---|---|---|---|
| | No Chemical Add | With 5.5% Diammonium Phosphate Add | With 5.5% Boric Acid Add |
| Fiber (100%) | Traveled length of tunnel in 1 minute 45 seconds | Traveled length of tunnel in 2 minutes 35 seconds | Traveled length of tunnel in 2 minutes 45 seconds |
| Alumina trihydrate (50%) Fiber (50%) | 14¼" | 16½" | 10½" |

*The fiber was the dry process pressure refined type described in Table X.

Further evidence of this synergistic effect is shown in Table VI which lists ASTM E84 test results for boards containing various levels of alumina trihydrate and borax:boric acid (1:1). The borax is not essential, but prevents undue hydrolysis on the surface of the board in localized areas, and aids in solubilizing the boric acid.

Table VI

ASTM E84 Tests of Various Levels of Alumina Trihydrate and Borax:Boric Acid in Hardboard

| Composition* (% by weight) | ASTM E84 test results | |
|---|---|---|
| | Flamespread index | Smoke |
| Fiber (100%) | 174 | 250 |
| Fiber (99%) Borax:boric acid (1%) | 164 | 134 |
| Fiber (98%) Borax:boric acid (2%) | 151 | 142 |
| Fiber (96%) Borax:boric acid (4%) | 124 | 51 |
| Fiber (95%) Borax:boric acid (5%) | 115 | 55 |
| Fiber (94%) Borax-boric acid (6%) | 118 | 47 |
| Fiber (78%) Alumina trihydrate (22%) | 103 | — |
| Fiber (70%) Alumina trihydrate (30%) | 96 | 62 |
| Fiber (50%) Alumina trihydrate (50%) | 38 | 0 |
| Fiber (71%) Alumina trihydrate (23%) Borax:boric acid (6%) | 60 | 13 |
| Fiber (66%) Alumina trihydrate (28%) Borax:boric acid (6%) | 44 | 0 |
| Fiber (60%) Alumina trihydrate (28%) Borax:boric acid (12%) | 21 | 0 |
| Fiber (48%) Alumina trihydrate (47%) Boric acid (5%) | 18 | — |

*The borax:boric acid was a 1:1 blend.

As these results indicate, a substantial percentage of alumina trihydrate can be replaced by a small percentage of about ½-7% by weight of a boron compound, such as boric acid, capable of providing $B_2O_3$ at a temperture below about 400° C., and particulatly at or below the combustion temperature of the combustible component in the board containing alumina trihydrate. For example a Class II product having a flamespread index of about 60 would, if feasible, require approximately 40-45 parts by weight alumina trihydrate. A Class II board having the same flame spread index can be manufactured while including only 23 parts by weight alumina trihydrate with the addition of 3% $B_2O_3$ forming compound. In this manner about 40-50% by weight of alumina trihydrate can be economically saved while providing a product having substantially increased strength. Similarly a product which would need 65 parts by weight alumina trihydrate to produce a Class I product (having a FSI less than about 25) when manufactured in accordance with the present invention needs only about 28 parts alumina trihydrate with the addition of 6 parts by weight $B_2O_3$ forming compound.

Thus, by the addition of 6 parts by weight of a $B_2O_3$ source, 37 parts by weight alumina trihydrate can be economically saved while providing a much stronger product.

The active boron component necessary in combination with the alumina trihydrate to achieve synergistic flamespread reduction is $B_2O_3$. The $B_2O_3$ can be provided by a number of boron containing compounds such as boric acid, and the ammonium borates such as the bi and pentaborates. Each of these $B_2O_3$-yielding compounds emits a green flame when the board containing the compound is subjected to fire tests. To achieve the full advantage of the present invention the boron compound should be capable of yielding $B_2O_3$ at a temperature at or below the pyrolysis temperature of the combustible component in the board. Both boric acid and the ammonium borates are capable of providing $B_2O_3$ below about 400° C. and at the approximate pyrolysis temperature of cellulosic fibers. Further, alumina trihydrate dehydrates at about the same temperature. More stable $B_2O_3$ sources, such as the zinc borates and sodium borates, require much higher temperatures than 400° C. to yield $B_2O_3$ and do not exhibit the synergism noted with boric acid and ammonium borates. The source of $B_2O_3$ should be present in the final product in an amount of at least about ½% by weight of the product so that the flame-spread will be sufficiently reduced. Additions greater than about 10% by weight may cause excessive water sensitivity of the final product. This is particularly true when borax is used as a buffer since it will also cause increased water sensitivity of the final product. Charring of the man-made fibrous product may also become excessive at high borate levels. It is therefore not recommended that the source of $B_2O_3$ be present in an amount which will yield greater than about 10% by weight $B_2O_3$ in the final product.

Alumina trihydrate, also known as Gibbsite α-alumina trihydrate, hydrated alumina, and aluminum trihydroxide, should be present in the man-made fibrous product in an amount of at least about 10% by weight to obtain the full advantage of the invention. Alumina trihydrate is ideal for incorporation in man-made fibrous boards since it is stable at ordinary consolidation (hot-pressing) conditions and releases water at approximately the pyrolysis temperature of man-made fibrous products. The chemically bonded water molecules of the alumina trihydrate will separate, causing the alumina to dehydrate at elevated temperatures in the range of about 200°-500° C. The dehydration is an endothermic reaction requiring a substantial amount of heat and materially aids in flamespread reduction. Further, the separated water molecules and resulting steam production aids in flamespread reduction by mixing of steam with the flammable gases to provide dilution thereof. A wide range of alumina trihydrate particle sizes and purity grades can be obtained from various manufacturers, and some typical properties of these alumina trihydrates are given in Table VII.

Table VII

| Grades<br>Typical properties* | | C-30 | C-31 | C-31 coarse | C-37 | C-330 | C-331 | 705 |
|---|---|---|---|---|---|---|---|---|
| $Al_2O_3$ | % | 64.9 | 65.0 | 64.9 | 64.2 | 65.0 | 65.0 | 64.1 |
| $SiO_2$ | % | 0.012 | 0.01 | 0.01 | 0.07 | 0.02 | 0.01 | 0.04 |
| $Fe_2O_3$ | % | 0.008 | 0.003 | 0.004 | 0.002 | 0.025 | 0.006 | 0.01 |
| $Na_2O$ | % | 0.40 | 0.15 | 0.20 | 0.42 | 0.30 | 0.15 | 0.60 |
| Moisture (110 C) | % | 0.10 | 0.04 | 0.04 | — | 0.40 | 0.40 | 0.60 |
| Bulk density, loose, $lb/ft^3$ | | 75–85 | 60–70 | 70–80 | 50–60 | 44.00 | 44.00 | 5–9 |
| Bulk density, packed, $lb/ft^3$ | | 95–105 | 75–85 | 90–100 | 60–70 | 77.00 | 77.00 | 6–12 |
| Specific Gravity | | 2.42 | 2.42 | 2.42 | 2.53 | 2.42 | 2.42 | 2.40 |
| Seive analysis (cumulative) | | | | | | | | |
| On 100 mesh | % | 5–20 | 0–1 | 0–10 | 6–12 | — | — | — |
| On 200 mesh | % | 65–90 | 5–10 | 40–80 | 30–60 | — | — | — |
| On 325 mesh | % | 90–98 | 30–65 | 85–97 | 75–95 | 1.0 | 1.0 | 0.04 |
| Through 325 mesh | % | 2–10 | 35–70 | 3–15 | 5–25 | 99.0 | 99.0 | 99.96 |

*Data was taken from Alcoa Product Data Sheet-Chemicals, section GA4A, November 1, 1972

The coarser, less pure grades have been found adequate for use in both the wet and dry process. Without the addition of the $B_2O_3$ yielding compound, however, it is very difficult to manufacture a man-made alumina trihydrate containing fibrous product having adequate physical properties for commercial production since such a product must contain approximately 45% alumina trihydrate for a Class II product and 60–70% for Class I product. In accordance with the present invention, by combining a source of $B_2O_3$ with the alumina trihydrate, a Class II flamespread rated man-made fibrous product can be manufactured having less than about 45% alumina trihydrate for a Class II product and more particularly less than 30% alumina trihydrate. A Class I product would require 65% alumina trihydrate without the $B_2O_3$ source but only needs 30–35 parts alumina trihydrate with the $B_2O_3$ source.

The point of addition of the alumina trihydrate and the $B_2O_3$ source depends upon the method used in manufacturing the board. When the man-made fibrous product of the present invention is manufactured by the wet process, the alumina trihydrate particles are slurried with the fibrous material, and the wetlap formed and dewatered on a water pervious support member, such as a fourdrinier wire, to a moisture content in the range of about 25–75% by weight. A source of $B_2O_3$, such as boric acid, is then deposited onto the surface of the partially dewatered mat. It is preferred to add the source of $B_2O_3$ to the wetlap surface when it has a moisture content in the range of about 40–60% by weight. The source of $B_2O_3$ is deposited onto the surface of the partially dewatered mat in any manner known in the art, for example by allowing the source of $B_2O_3$ to flow over a wire positioned above the surface of the partially dewatered wetlap as it is continuously formed. The source of $B_2O_3$ penetrates into the partially dewatered mat in normal drying and hot pressing operations used to form and consolidate the man-man fibrous product. The fibrous product is dried in any manner known in the art, such as in drying ovens or during hot pressing at, for example, 750 psi and 325° F., to provide a product having a moisture content less than about 9% by weight and preferrably in the range of about 5–7% by weight. If desired, the product can be completely dried to provide a bone dry product, however, the bone dry product will pick up ambient moisture so that when the moisture content reaches equilibrium it is commonly in the range of about 5–7% by weight.

Another method of providing a source of $B_2O_3$ in the man-made fibrous product made by the wet process is by impregnating the fibrous product after consolidation. Impregnation after consolidation is preferred since by depositing the $B_2O_3$ source onto the surface of the wet lap, a portion of the $B_2O_3$ source is lost, either by drainage through the wet mat or by vaporization during hot pressing. When the $B_2O_3$ source is deposited onto the surface of the wet lap, it must be provided in an amount greater than the desired final amount of $B_2O_3$. Generally, an amount of about 20–30% of the $B_2O_3$ source is lost as a result of drainage or vaporization during consolidation so that up to about 10% weight of the $B_2O_3$ source can be added to the surface of the wet lap. Little difference in flamespread reduction is noted with respect to the method of $B_2O_3$ source addition. Flamespreads of boards made with additions of a $B_2O_3$ source to the wetlap as compared to boards made with impregnations of the $B_2O_3$ source are set forth in Table VIII.

Table VIII

A Comparison of Post-Press Adds of Borates to Wet Process Boards Containing Alumina Trihydrate

| Composition*<br>(% by weight) | Method of Borate Addition | Monsanto Tunnel Flamespread Length |
|---|---|---|
| Alumina trihydrate (30%)<br>Fiber (60%) | no borate added | traveled length of tunnel in 3 minutes 45 seconds |
| Alumina trihydrate (30%)<br>Borax: boric acid (6% add retained)<br>Fiber (70%) | pre-press add to wetlap | 16" |
| Alumina trihydrate (32%)<br>Borax:boric acid (5.5% add retained)<br>Fiber (68%) | post-press impregnation | 16½" |

*The fiber was the wet process interior type described in Table X. The borax:boric acid was a 1:1 blend by weight. Addition of borates given in % by weight of alumina trihydrate plus fiber.

When the man-made fibrous product of the present invention is manufactured by the dry process, the alumina trihydrate is added at any convenient point before the dry mat is formed and before it is consolidated under heat and pressure, for example at 600 psi and 425° F. It is generally preferred to add the alumina trihydrate at a point which allows intimate mixing of the alumina trihydrate and wood fiber in the system air currents prior to felting on the forming wire. For example, the alumina trihydrate can be added to a conduit used to convey the fibers to the forming wire. Resin and wax can be added to the fiber or the fiber/alumina trihydrate blend by methods well known to those in the art. The $B_2O_3$ source is added either during primary manufacture or by impregnation after consolidation of the product. When added to the wood fiber during primary manufacture, the $B_2O_3$ source can be premixed in powdered form with the alumina trihydrate or can be added separately at any convenient point in either powder or solution form. When the $B_2O_3$ source is added by impregnation after the product has been pressed, vacuum-pressure impregnation techniques, well known to those in the trade, are used. The method or order of the addition of the $B_2O_3$ source and the alumina trihydrate is not critical. More of the synergistic mixture of alumina trihydrate and the $B_2O_3$ source may be added to the center of the product than the faces, but the exact distribution is not critical with respect to the uniqueness of the synergism noted.

Alumina trihydrate losses during formation play an important part in the costs, and laboratory work has shown that retention can be improved significantly with larger particle sizes and finer fiber types. Almost 100% recovery of the alumina trihydrate from the pit water is possible since it quickly settles out. Alumina trihydrate formation losses with various fiber and alumina trihydrate sizes are set forth in table IX.

Table IX

Wet Process Formation Losses With Various Fiber And Alumina Trihydrate Sizes*

| Fiber Type | No alumina trihydrate | With alumina trihydrate | | |
|---|---|---|---|---|
| | | ultra-fine | medium | coarse |
| Coarsest | | | | |
| Exterior grade wet process fiber (Masonite process) | 3% | — | | |
| | | | 30% | — |
| Interior grade wet process fiber (Masonite process) | 3% | | | |
| | | 30% | 25% | |
| | | | | 14% |
| Interior grade dry process fiber (pressure refined) | 9% | — | | |
| | | | 21% | — |

Finest
*The losses were determined on blends of equal amounts of fiber and alumina trihydrate, plus a 3% add of phenol formaldehyde resin and a 1 ½% add of wax. The blends without alumina trihydrate contained only fiber plus a 3% add of resin and a 1 ½% add of wax.

The fiber distributions of typical fiber blends used in the manufacture of the product of the present invention are set forth in Table X.

Table X

| Fiber Type | Fiber Size Distributions Percentage of Material on U.S. Seive Number:* | | | | | | |
|---|---|---|---|---|---|---|---|
| | 6 | 9 | 20 | 40 | 100 | 170 | pan |
| Exterior grade wet process fiber (Masonite process) | 0.8% | 5.9% | 29.3% | 61.7% | 84.6% | 91.7% | 100.1% |
| Interior grade wet process fiber (Masonite process) | — | 4.8% | 29.1% | 57.6% | 81.8% | 90.6% | 100.0% |
| Interior grade dry process fiber (pressure refined) | — | — | 6.6% | 25.1% | 73.7% | 84.5% | 99.9% |

*Percentages determined after 30 minute runs of 40 gram samples in a commercial Ro-Tap.

We claim:

1. A fibrous product comprising combustible fibers, an alumina hydrate in an amount in the range of 10-60% by weight of said product, and a boron containing compound selected from the group consisting of boric acid, mixture of boric acid and borax, and an ammonium borate, said borate containing compound being present in said product in an amount of at least ½% by weight of said product.

2. A product as defined in claim 1 wherein the boron containing compound comprises boric acid.

3. A product as defined in claim 1 wherein the boron containing compound comprises an ammonium borate.

4. A product as defined in claim 3 wherein the ammonium borate comprises ammonium pentaborate.

5. A product as defined in claim 3 wherein the ammonium borate comprises ammonium biborate.

6. A product as defined in claim 1 wherein the boron containing compound comprises 1-10% by weight of said product.

7. A product as defined in claim 1 wherein the combustible fibers are included in said product in an amount in the range of 20-90% by weight of the product.

8. A product as defined in claim 1 wherein the borax is included in an amount of about 1-10% by weight of said product.

9. A product comprising cellulosic fibers, 20-60% by weight alumina trihydrate, and a boron compound selected from the group consisting of boric acid, mixture of boric acid and borax, and an ammonium borate, said boron compound contained in said product in an amount of at least ½% by weight of said product.

10. A product as defined in claim 9 wherein the boron compound comprises ammonium pentaborate.

11. A product as defined in claim 9 wherein the boron compound comprises ammonium biborate.

12. A method of making a fibrous product having a reduced flamespread comprising:
mixing together a slurry of components comprising water and combustible fibers,
depositing at least a portion of said slurry onto a water pervious support member to form a wet mat,
adding to the wet mat alumina trihydrate, and a source of $B_2O_3$ effective in reducing the flamespread of the fibrous product, said source of $B_2O_3$ selected from the group consisting of boric acid, mixture of boric acid and borax, and an ammonium borate, wherein said alumina trihydrate is added in an amount sufficient to provide 10-60% alumina trihydrate in said fibrous product and wherein said source of $B_2O_3$ is added in an amount sufficient to provide at least ½% $B_2O_3$ in said fibrous product, and
consolidating the fibrous product.

13. A method as defined in claim 12 wherein said source of $B_2O_3$ is added to said slurry of components.

14. A method as defined in claim 12 wherein said source of $B_2O_3$ is added to said wet mat when said wet mat contains about 20-60% by weight water.

15. A method as defined in claim 14 wherein said alumina trihydrate is added to said slurry of components.

16. A method as defined in claim 14 wherein the source of $B_2O_3$ is deposited onto the wet mat in an amount sufficient to provide 1-5% by weight of said $B_2O_3$ source in the consolidated product.

17. A method as defined in claim 12 wherein the source of $B_2O_3$ is deposited on the surface of the wet mat in an amount of about 5–8% by weight of solids in the wet mat.

18. A method of forming a fibrous product having a reduced flamespread index comprising:

mixing together cellulosic fibers, alumina trihydrate, and a binder, adding a source of $B_2O_3$ effective in reducing the flamespread of the fibrous product, said source of $B_2O_3$ selected from the group consisting of boric acid, mixture of boric acid and borax, and an ammonium borate, wherein said alumina trihydrate is added in an amount sufficient to provide 10–60% alumina trihydrate in said fibrous product and wherein said source of $B_2O_3$ is added in an amount sufficient to provide at least ½% $B_2O_3$ source in said fibrous product, air-laying the mixture onto a support member, and consolidating the mixture with heat and pressure to form a fibrous product having a reduced flamespread index.

19. A method as defined in claim 18 wherein the source of $B_2O_3$ is added to the fibers prior to air-laying the mixture onto the support member.

20. A method as defined in claim 18 wherein the source of $B_2O_3$ is impregnated into the fibrous product after consolidation of said product.

21. A method of making a fibrous product having a reduced flamespread comprising:

mixing together a slurry of components comprising water, alumina trihydrate and combustible fibers, depositing at least a portion of said slurry onto a water pervious support member to form a wet mat, removing at least a portion of the water from said wet mat, and adding thereto a source of $B_2O_3$ effective in reducing the flamespread of the fibrous product, said source of $B_2O_3$ selected from the group consisting of boric acid, mixture of boric acid and borax, and an ammonium borate, wherein said alumina trihydrate is combined in said slurry in an amount sufficient to provide 10–60% alumina trihydrate in said fibrous product and wherein said source of $B_2O_3$ is added in an amount sufficient to provide at least ½% $B_2O_3$ source in said fibrous product.

22. A method of making a fibrous product having a reduced flamespread comprising:

mixing together a slurry of components comprising water and combustible fibers, depositing at least a portion of said slurry onto a water pervious support member to form a wet mat, removing a portion of said water from said wet mat to form a partially dried wet mat, adding alumina trihydrate to said partially dried wet mat when said partially dried wet mat contains water in an amount of 20–60% by weight, wherein said alumina trihydrate is added in an amount sufficient to provide 10–60% alumina trihydrate in said fibrous product, and adding a source of $B_2O_3$ effective in reducing the flamespread of the fibrous product, said source of $B_2O_3$ selected from the group consisting of boric acid, mixture of boric acid and borax, and an ammonium borate, wherein said source of $B_2O_3$ is added in an amount sufficient to provide at least ½% $B_2O_3$ source in said fibrous product.

23. A method as defined in claim 21 wherein said source of $B_2O_3$ is impregnated into said fibrous product after consolidation thereof.

24. A method as defined in claim 22 wherein said source of $B_2O_3$ is impregnated into said fibrous product after consolidation thereof.

25. A method of forming a fibrous product having a reduced flamespread index comprising:

mixing together cellulosic fibers, alumina trihydrate, and a binder, said alumina trihydrate added in an amount such that after consolidation of the fibrous product, said product contains alumina trihydrate in an amount of 10–60% by weight of said product, air-laying the mixture onto a support member, consolidating the mixture under heat and pressure to form a fibrous product, and adding a source of $B_2O_3$ to said consolidated fibrous product, effective in reducing the flamespread of the fibrous product, said source of $B_2O_3$ selected from the group consisting of boric acid, mixture of boric acid and borax, and an ammonium borate, wherein said source of $B_2O_3$ is added in an amount sufficient to provide at least ½% $B_2O_3$ source in said fibrous product.

* * * * *

UNITED STATES PATENT OFFICE
CERTIFICATE OF CORRECTION

Patent No. 4,130,458      Dated December 19, 1978

Inventor(s) Moore et al

It is certified that error appears in the above-identified patent and that said Letters Patent are hereby corrected as shown below:

IN THE CLAIMS

In claim 1, column 13 at line 66, delete "borate" and insert "boron"

In claim 12, column 14 at line 43 should read as follows:

provide at least 1/2% $B_2O_3$ source in said fibrous product,

Signed and Sealed this

Twelfth Day of June 1979

[SEAL]

Attest:

RUTH C. MASON
*Attesting Officer*

DONALD W. BANNER
*Commissioner of Patents and Trademarks*